Oct. 13, 1953
J. N. MARSHALL
2,655,650
RADAR GROUND APPROACH SYSTEM
Filed March 19, 1951
3 Sheets—Sheet 2
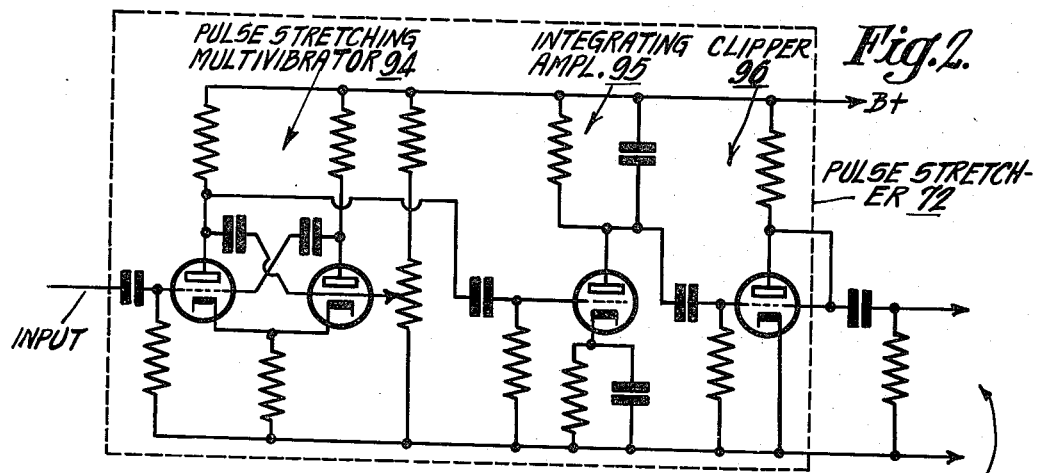
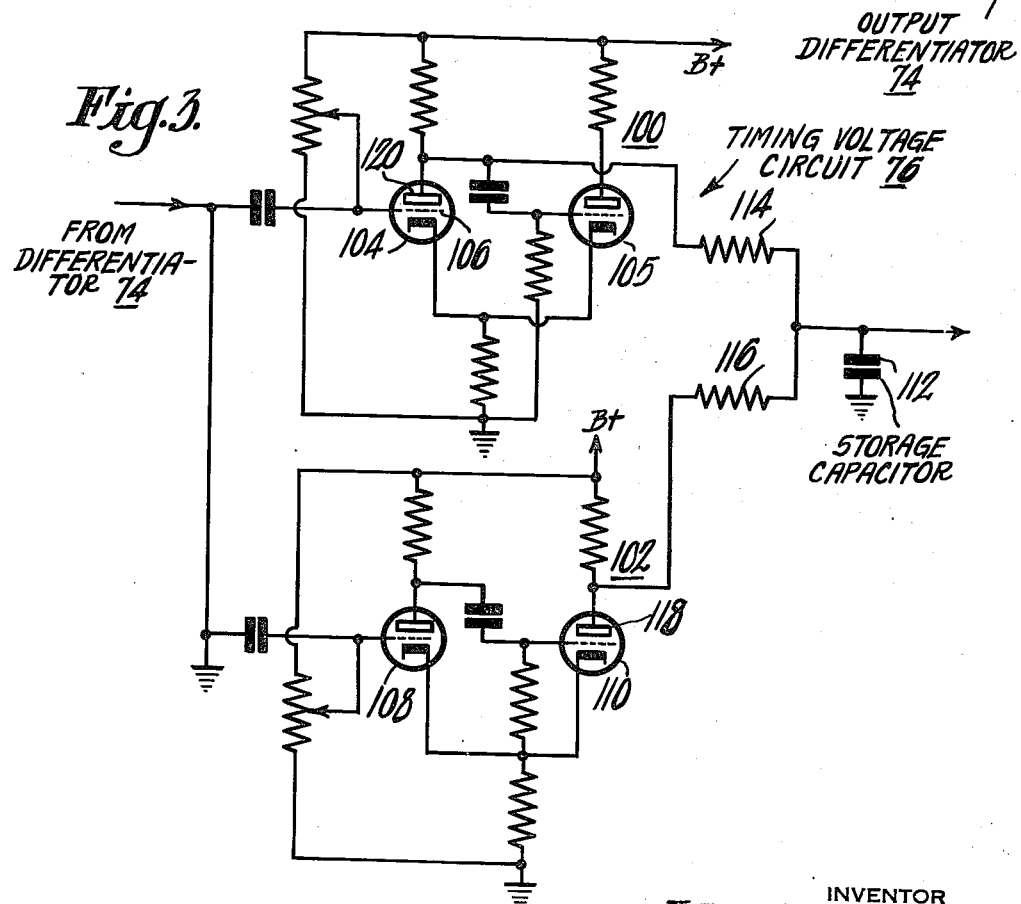
INVENTOR
John N. Marshall
BY
ATTORNEY

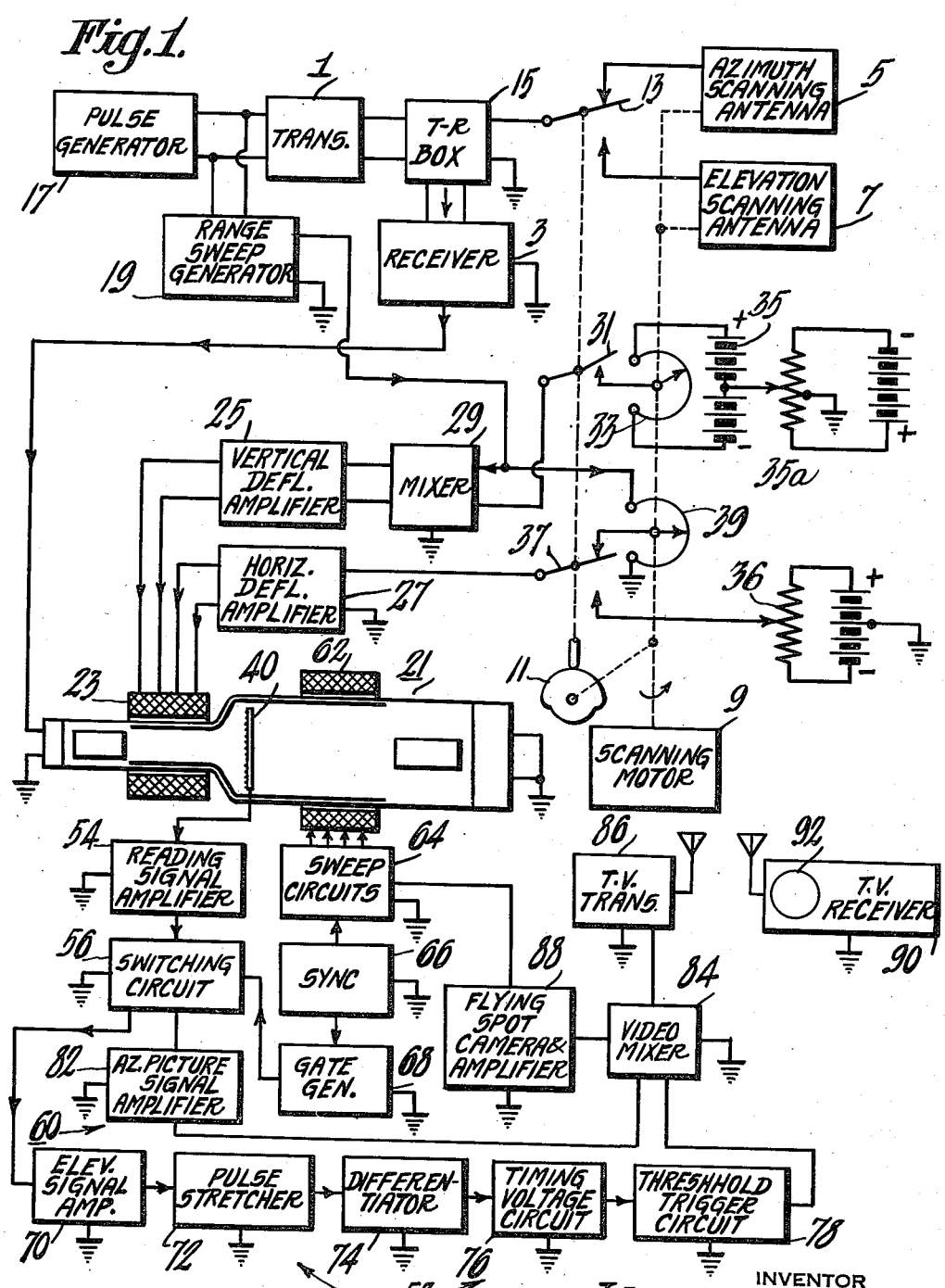

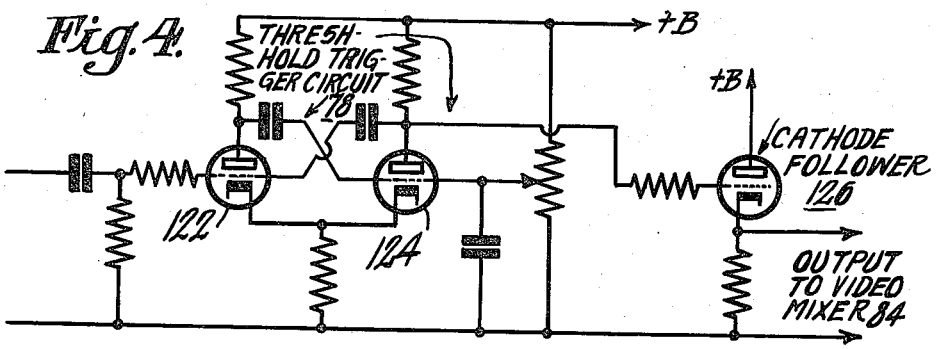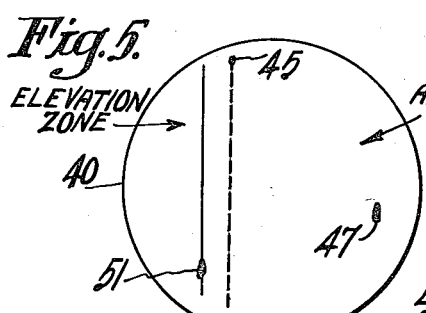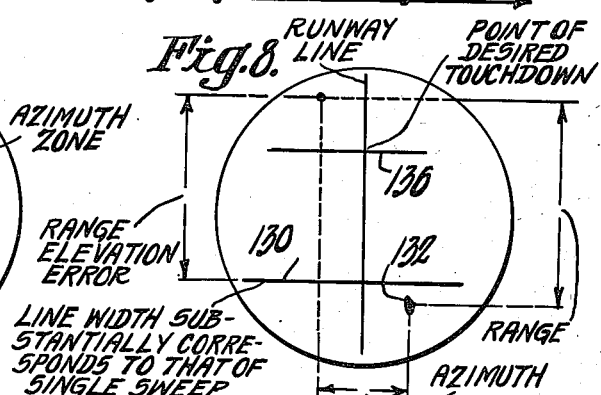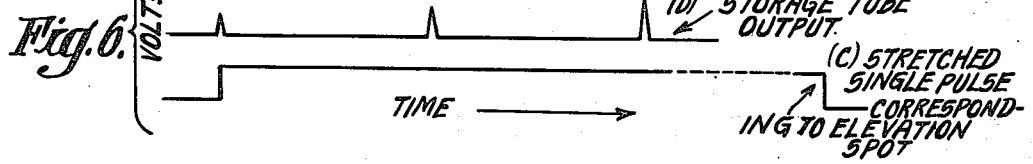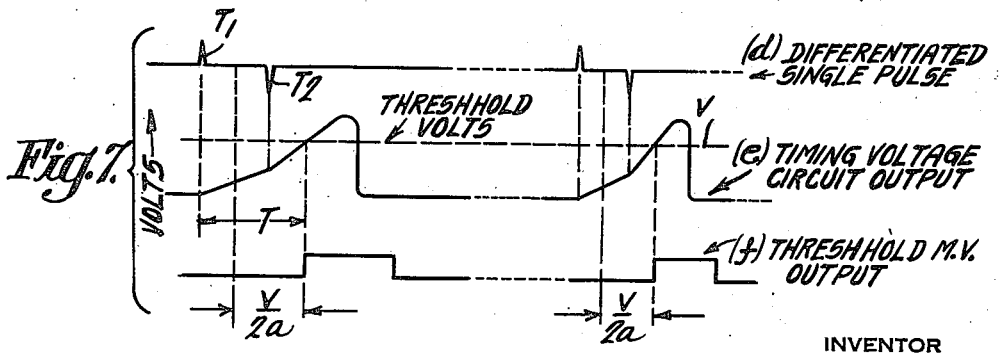

Patented Oct. 13, 1953

2,655,650

UNITED STATES PATENT OFFICE 2,655,650

RADAR GROUND APPROACH SYSTEM

John N. Marshall, Bryn Mawr, Pa., assignor to Radio Corporation of America, a corporation of Delaware Application March 19, 1951, Serial No. 216,797

14 Claims. (Cl. 343—11)

1

The present invention relates to radar (radio echo detection and ranging) and more particularly to radar ground approach systems for aircrafts.

In order to simplify the operation of ground approach control of aircraft about to land at a landing field, it is desirable to provide the azimuth, elevation, and range information all in a single visual display. A composite display and means for producing it are described and claimed in the U. S. Patent 2,459,481 to Irving Wolff and Philip J. Herbst and entitled "Instrument Landing System." An improved system of the same type is described in the copending application, Serial No. 783,354, filed October 31, 1947, of Harold J. Schrader, now Patent 2,549,641. In a display for "Ground Control Approach" (GCA) radar of the type described in the mentioned patent or application, a visual spot representing the aircraft is shown on a screen, the spot being displaced to the right or left of a line representing the runway by an amount indicative of the azimuthal error from the desired glide path. A horizontal line indicates the elevation and is above or below the aircraft spot by an amount indicative of the angle by which the aircraft is above or below the desired glide path. One of the difficulties encountered with these systems has been that the horizontal line described above has a substantial width, because produced from a displayed spot or the signals corresponding thereto. For example, the line may be produced by impressing a horizontal repetitive sweep on a cathode ray tube at the time signals corresponding to range and elevation are being impressed on the tube. But such signals cause a spot or line of finite width. This width makes it difficult for the pilot or observer to judge accurately the amount of elevation error with respect to the glide path. Judging this error is particularly difficult when the horizontal line passes through or in the near neighborhood of the aircraft spot. The line tends to obscure the spot and the relative positions of the spot and line are difficult or impossible of determination.

It is an object of the present invention to improve a display for GCA radar and particularly to improve a display of the type described.

A further object of the invention is to reduce the width of the horizontal line in a display of the type described the position of which line relative to the aircraft spot is indicative of the error in elevation with respect to the desired glide path.

A further object of the invention is to provide

2 a GCA system the signals of which may be readily televised to a pilot or other remote operator.

The foregoing and other objects, advantages, and novel features of the invention will be more apparent from the following description when taken in connection with the accompanying drawing in which like reference numerals refer to like parts and in which:

Fig. 1 is a schematic block diagram of an embodiment of the present invention;

Figs. 2, 3, and 4 are diagrams respective of some of the components of the system of Fig. 1;

Fig. 5 is a schematic view of the storage target of a storage tube of Fig. 1 to aid in explaining the operation of the invention;

Figs. 6 and 7 are idealized wave forms useful in understanding the operation of the circuits of Figs. 1 to 4; and Fig. 8 is a schematic face view of a cathode ray tube indicator illustrative of the indications produced by the system of Fig. 1.

In accordance with the invention, in a display of the type described, only a single horizontal sweep line is brightened to produce a sharp, easily read and observed "horizon" line on the display tube. The observer or pilot can then judge accurately his elevation above or below the proper glide path by the distance of the line above or below the pip corresponding to the range and azimuth position of the aircraft. The breadth of the horizontal line does not obscure the accuracy of the observation. An important feature of the invention resides in the producing of a single pulse occurring at a constant predetermined time after a series of pulses derived from a "spot" stored on a storage tube. Such a stored spot produces a series of pulses in the video signals as the stored spot is read. These series of pulses are stretched to produce a long single pulse. From the long single pulse a short single pulse is derived from a monostable pulse circuit. The derived pulse occurs at, or more accurately has its inception at, a predetermined time after the average time of the long pulse, or what is the same, a predetermined time after the mean time of the series of pulses. As more fully appears hereinafter, the derived pulse may be employed to produce the desired narrow line.

More particularly, a typical ground approach radar system includes means for scanning a volume of space with radio energy. This space is that in the vicinity of the expected approach path of the aircraft. The position of the aircraft in azimuth and elevation may thus be followed or tracked. A storage tube is provided for storing in separate azimuth and elevation zones on the storage target the information secured by the radar. In the azimuth zone is stored a spot whose position in respect to the undeflected position of a cathode ray beam controlling the storage corresponds to the position of the aircraft in range and azimuth. In the elevation zone is stored a spot whose position along a line with respect to the undeflected cathode ray position corresponds to range plus a quantity proportional to the elevation error, that is the elevation angle of said aircraft from the elevation angle of the glide path at the aircraft range. Signals corresponding to those stored in the zones are taken in separate elevation and azimuth channels. In the elevation channel a a monostable pulse circuit is provided which produces from the signals arising from the stored elevation spot a single pulse of a predetermined time duration substantially equal to that of a single sweep in the television display to be reproduced. This single pulse is mixed with the signals from the azimuth channel to produce signals for the desired display. However, it is apparent that this single pulse, because of its specified time duration, produces a single comparatively narrow width line corresponding, in its displacement from the aircraft spot, the elevation error from the glide path when the display is reproduced on a cathode ray tube with a luminescent screen or the like. Other monostable pulse circuits are known which may be employed instead of the multivibrators shown and described herein. With respect to these other monostable circuits many of these may be those described in volume 19, of Radiation Laboratory Series, entitled Wave Forms, edited by Chance et al. Furthermore, in accordance with the invention, the single pulse signal for the horizontal line is produced at a fixed or constant time after the mean time of occurrence of the first and last of signals in the elevation channel corresponding to the stored spot. A D. C. compensating voltage is then applied to restore the horizontal line signal to its correct time relationship, the said D. C. signal being applied preferably at the storage tube, whereby the horizontal display line when the aircraft is on the proper glide path passes through the center of the aircraft spot. In other words, in the final display the occurrence of the line corresponds to the center point of the elevation spot or elevation line of previous displays of this nature.

Referring now more particularly to Fig. 1, the radar equipment includes a pulse transmitter 1, a receiver 3, and in the present example two antennas 5 and 7. The antenna 5 has a fan-shaped directive pattern, extremely narrow (perhaps a fraction of a degree wide) in azimuth, and relatively wide, say several degrees, in elevation. The antenna 7 has a similarly shaped pattern, narrow in elevation and wider in azimuth. The directive pattern of the antenna 5 can be oscillated throughout a sector of several degrees in azimuth and that of the antenna 7 can be oscillated similarly in elevation.

The antennas 5 and 7 may be structures of the type described in U. S. Patent 2,504,333, issued April 18, 1950, to Harley Iams, and entitled "Radio Wave Devices." However, any other known antenna devices providing fan-like beams which can be oscillated in the manner described may be used. A motor 9 is coupled to the antennas 5 and 7 for driving them to scan cyclically through horizontal and vertical sectors respectively. The antennas are positioned so that the sectors which they scan include and are approximately centered on the glide path to be followed by an aircraft in landing.

The motor 9 drives a cam 11, which periodically actuates a switch 13 to bring the antennas 5 and 7 into operation alternately, each completing one scan during its respective period of operation. A T–R box 15 is included in the connections between the switch 13 and the transmitter and receiver, to enable each of the antennas to be used for both transmission and reception.

A pulse generator 17 modulates the transmitter 1, and also controls a range sweep generator 19, which is an oscillator providing an output of substantially sawtooth wave form. A wave from the generator 19 starts coincidentally with the production of each pulse by the pulse generator 17.

A cathode ray storage tube 21 is provided which may be, for example, of the type described by Louis Pensak in the RCA Review, volume X, No. 1, March, 1949, page 59, in the article entitled "The Graphecon, a Picture Storage Tube." The storage tube 21 has a beam deflection yoke 23 for the writing beam connected to vertical and horizontal deflection signal amplifiers 25 and 27 respectively. The storage control electrode of the tube 21 is connected to the receiver 3. Conventional centering control means, not shown, are provided for adjustably biasing the deflection means to "position" the cathode ray beam to a predetermined spot on the storage target 40 of the tube 21.

Vertical deflection signals are supplied to the amplifier 25 through a mixer 29. The mixer 29 is connected directly to the range sweep generator 19, and through a switch 31 to an elevation sweep signal generator, which in the present example comprises a voltage divider 33 energized by a D. C. source 35, which may be raised or lowered to secure a fixed D. C. voltage compensation as by a divider 35a for a reason disclosed more fully hereinafter, to secure proper correspondence of horizontal line and aircraft spot in the final display. The divider 33 is driven continuously by the scanning motor 9. The resistance-rotation characteristic of the voltage divider 33 is uniform, so that the elevation sweep signal is substantially a sawtooth shaped voltage wave whose period is the same as the antenna scanning period. The switch 31 is ganged with and operates in synchronism with the switch 13, connecting the voltage divider 33 to the mixer 29 only during the periods when the elevation scanning antenna 7 is in operation.

The horizontal deflection amplifier 27 is connected to a switch 37 which also operates in synchronism with the switch 13. During azimuth scanning, the amplifier 27 is connected to a voltage divider 39, which is supplied by the range sweep generator 19 and is driven continuously by the scanning motor 9. The resistance-rotation characteristic of the voltage divider 39 is uniform like that of the voltage divider 33. Thus the range sweep signal as applied to the amplifier 27 is modulated sawtooth fashion, the modulation period coinciding with the antenna sweep period. The switch 37 connects horizontal deflection amplifier 27 to another adjustable voltage divider 36 during elevation scanning by the antenna 7.

The operation of the system thus far described is as follows: With the switches 13, 31, and 37 in their upper positions as shown in the drawing, the azimuth antenna 5 is in use and the elevation antenna 7 is idle. The pulse generator 17 modulates the transmitter 1, causing it to produce corresponding pulses of radio frequency energy; these pulses are radiated by the antenna 5 as it scans in azimuth. When an aircraft coming in for landing is struck by the beam of the antenna 5, it returns a signal to the ground station, either by deflection or by retransmission from a suitable "responder" beacon carried on the aircraft. In either case, the returned signal produces output from the receiver 3 in the form of a train of pulses like the pulses from the generator 17 but delayed with respect thereto by a time interval which corresponds to the distance or range of the aircraft from the ground station. This occurs only during the time that the craft is within the beam of the antenna 5.

Coincidentally with the transmission of each pulse, the range sweep generator starts a sawtooth wave which goes through the mixer 29 to the vertical deflection circuit of the cathode ray tube 21, and also through the voltage divider 39 to the horizontal deflection circuit of the tube 21. The cathode ray is normally biased so as to provide substantially no storage on target 40, illustrated schematically in Fig. 5.

When the returned signal is received by the receiver 3, it overcomes the bias and allows the cathode ray of the storage tube to store a spot 47 of charge on the target in the azimuth zone. The position of the spot vertically on the target depends upon the instantaneous value of the vertical deflection signal at that time, and hence upon the delay between the transmitted and received pulses. Referring to Fig. 5, the point 45 represents the "centered" or undeflected position of the cathode ray beam upon the target 40 of the tube 21. The vertical deflection voltage from the range sweep generator drives the beam downward, say, the stored spot produced by a received signal appears at 47 in Fig. 5, and its distance vertically from the undeflected point 45 at which the beam strikes the target is proportional to the range of the aircraft.

The horizontal deflection circuit of the tube 21 is also energized by the range sweep generator 19, but to an extent which depends on the position of the voltage divider 39, and hence upon the azimuth of the beam of the antenna 5. Thus the displacement of the spot 47 (Fig. 5) laterally of the screen of the tube 21 is proportional to azimuth from the desired glide path. As the antenna 5 goes through its scan in azimuth, the cathode ray is deflected along successive radial lines in the azimuth zone from the point 45, scanning the target of the tube 21 in synchronism with the scanning in azimuth of the antenna 5. Preferably the total angle scanned on the storage tube target 40 is several times that scanned by the antenna 5, to afford maximum utilization of the available target surface. This type of scanning is called an "expanded sector" scan.

Upon completion of the azimuth scan, the switches 13, 31, and 37 move to their lower positions. The elevation scanning antenna 7 is substituted for the antenna 5, the horizontal deflection amplifier is connected to a fixed voltage from divider 36 disposing the writing cathode ray of tube 21 in the elevation zone, and the elevation sweep signal from the voltage divider 33 is applied to the mixer 29. The elevation sweep signal may start at some negative value at the beginning of the elevation scan, increasing in the positive direction to a maximum positive value at the end of the elevation scan. The voltage is zero when the elevation of the beam of the antenna 7 is substantially the same as the elevation angle at which the aircraft should be if on the desired glide path.

The elevation sweep signal is combined in the mixer 29 with the range sweep sawtooth, producing a sawtooth output. The range sweep repetition frequency is in practice hundreds or even thousands of times the elevation sweep frequency. However, the starting point of the range sweep during elevation scanning varies continuously during the elevation scan, being displaced from the normal by an amount which is greatest at the beginning and end of the scan, and is zero when the antenna beam elevation angle corresponds to the desired elevation of the aircraft. The stored spot is not deflected horizontally during the elevation scan. No signal is stored until receipt of an echo from the aircraft on the elevation antenna. At this time an elevation spot 51 is stored on the target 40.

The vertical distance of the stored elevation spot 51 from the spot deflection center 45 depends on the instantaneous magnitude of the sum of the range sweep signal and the elevation sweep signal, and thus is proportional to the range plus a quantity proportional to the difference between the actual elevation angle and the desired elevation angle of the aircraft. When the latter quantity is zero, the stored elevation spot 51 is at the same vertical distance from the point 45 as the stored spot 47 produced during the azimuth scan.

The signal stored on the target 40 may be taken off or read by a separate reading beam or cathode ray, as described in the said Pensak article, and amplified in a reading amplifier 54 the output of which is supplied through a switching circuit 56 to an elevation channel 58 and an azimuth channel 60. The sweep of the reading cathode ray may be controlled by voltages applied to a yoke 62 from sweep circuits 64. A synchronizing voltage 66 synchronizes the sweep circuits and a gate generator 68 which gate generator controls the switching circuit 56. The sweeps generated by the sweep circuit 64 may be considered as moving the reading beam in a raster crossing the target in horizontal lines from left to right as viewed in Fig. 5 successive lines being swept from top to bottom. The gate generator controls the switching circuit by a gating voltage which may be exemplified by line a of Fig. 6. The positive-going pulses displayed in line a of Fig. 6 cause the switching circuit to apply the signals from reading signal amplifier 54 to the elevation channel 58. In the periods between these times the signals from reading signal amplifier 54 are applied to the azimuth channel 60. The gating voltage from the gating generator 68 is synchronized with the sweep circuits so that signals from the elevation zone are applied only to the elevation channel 58 and signals from the azimuth zone are applied to the azimuth channel 60. The elevation channel includes an elevation signal amplifier 70, a pulse stretcher 72, a differentiator 74, a timing voltage circuit 76 and a threshold trigger circuit 78 connected with the output of one applied to the input of the other in the order named. The storage tube output amplified in the elevation channel 58 and taken from the elevation zone of target 40 is exemplified in part by line b of Fig. 6. Assuming that there is only one aircraft within the antenna beams, the signals from only one stored spot are fed through this channel, and these will consist of a series of pulses one for each time the sweep passes through the stored elevation spot 51. For the remainder of the time no signal is produced from the elevation zone. These signals or pulses are stretched to produce a single pulse exemplified by the pulse in line c for each stored elevation spot. This single pulse is differentiated as illustrated in Fig. 7, line d. It will be understood that Figs. 6 and 7 have widely different time bases. The output of differentiator 74 having the wave form similar to that of line d in Fig. 7 is applied to a timing voltage circuit the output of which is exemplified in line e of Fig. 7. This timing voltage circuit has the peculiar characteristic that its output will reach a voltage V a fixed period of time after the average time of occurrence of a pair of positive and negative going pulses, that is a fixed time after the instant of time half way between the times of occurrence of a pair of the output pulses arising from the differentiated single pulse. The output of the timing voltage circuit 76 is applied to the threshold trigger circuit 78 which is actuated by the voltage V to produce a pulse having a time duration substantially equal to a single sweep, by which is meant a horizontal sweep (as described) of the sweep circuits 64. The azimuth picture signals amplified in the amplifier 82 and the pulses from the threshold trigger circuit 78 are mixed in a video mixer 84 for application to the television transmitter 86. If desired, signals from a flying spot camera and amplifier 88 may also be mixed in the video mixer 84. A television receiver picks up the signal from the transmitter 86 and transforms the signals mixed in the video mixer and transmitted by the transmitter 86 into a television picture on a cathode ray tube 92 having a luminescent screen.

Returning again to the elevation channel 58, the pulse stretcher 72 is exemplified by the circuit of Fig. 2. The multivibrator 94 may be assumed to receive its input from the elevation signal amplifier which may be assumed to invert the signals from the storage tube output if they are of positive polarity or to leave them the same polarity if they are of negative polarity. Accordingly, the pulses exemplified by line b of Fig. 6 are applied to the pulse stretched multivibrator 94 in negative polarity. This multivibrator 94 is a monostable multivibrator having only one condition of stable equilibrium to which it returns. The negative-going pulses cause the monostable multivibrator 94 to depart from its condition of stable equilibrium for a predetermined time which is preferably made slightly less than the time duration of one sweep period. Thus for the majority of time in which the multivibrator receives the pulses arising from a single stored spot in the elevation zone such as spot 51, the pulse stretching multivibrator 34 is kept in one condition. Thus for each distinct stored spot in the elevation zone such as spot 51, the output of the multivibrator becomes a stretched single pulse with short drops to zero. This output is applied to an integrating amplifier 95 which largely eliminates the short drops. Remaining irregularities in the output as a result of the incomplete smoothing by the integrating amplifier and of the input pulses from the multivibrator 94 are unwanted in the output. Therefore, the output pulse is preferably further shaped before leaving the pulse stretcher 72 by a clipper stage 96. The differentiator 74 of the elevation channel 58 is simply a resistor capacitor combination at the output of the clipper 96.

The output of the differentiator 74 is applied to the timing voltage circuit 76 which is exemplified by the circuit of Fig. 3, to which is applied the output pulse from differentiator 74. The pulse is applied to a pair of monostable multivibrators 100, 102 each consisting of a pair of tubes 104, 106, and 108, 110 respectively. The monostable multivibrator 100 is connected so that the tube 104 to the grid 106 of which the incoming signal is applied, is normally conducting. The monostable multivibrator 102 is connected so that the tube 108 which receives the input pulses is normally non-conducting. The applied pulses are of the form exemplified at line d of Fig. 7. The first of each pair of pulses is positive and causes the tube 108 to start conducting. The next of the pair of pulses is negative and causes the tube 104 to cease conduction. A storage capacitor 112 is connected through a pair of resistors 114, 116, respectively, to the anodes 118, 120 of tubes 110 and 104. Let $T_1$ and $T_2$ represent the times of application of the respective pulses of a single pair. Then as long as the voltage charge on the storage capacitor 112 builds up in a substantially linear way, the voltage across the capacitor 112 at a time T may be written as:

$$a(T-T_1)+a(T-T_2)$$

where $a$ is a constant for the circuit and voltages applied. This increasing voltage will reach a voltage V when V is equal to the above expression. That is, at a time T after the first pulse of the pair when $$T=\frac{T_1+T_2}{2}+\frac{V}{2a}$$

Therefore, the voltage across the capacitor reaches the voltage V at a time $$\frac{V}{2a}$$

after the mean time of occurrence or the average time of occurrence of the differentiated pair of pulses. It is clear that in any single frame scan over the storage target 40 the time T will occur substantially half way between the occurrence of the first and last of the pulses shown at line b of Fig. 6 which correspond to the elevation spot 51. The timing voltage circuit multivibrators are preferably designed to have a recovery time to occur shortly after the voltage V is reached for the greatest time separation expected between $T_1$ and $T_2$, so that more than one stored elevation pulse may be readily handled by the system of the invention.

The output of the timing voltage circuit 76, which is the voltage across capacitor 112 is applied to the threshhold trigger circuit 78 of Fig. 4. The threshold trigger circuit 78 is another monostable multivibrator comprising a pair of tubes 122 and 124. This circuit has the tube 124 normally conducting and the tube 122 normally non-conducting. As the voltage from the timing voltage circuit 76 is applied, the tube 122 starts to conduct when the applied voltage reaches the threshold value V. The threshold trigger circuit 78 then produces an output pulse such as illustrated at line f in Fig. 7 through the cathode follower 126. The output pulse is preferably of the length of a single line of the sweep generated in the sweep circuits 54. The single output from the trigger threshold circuit 98 is mixed in the video mixer 34 from the signals from the azimuth picture amplifier 82. The composite picture signals so mixed may be supplemented as desired for example, by signals from a flying spot camera and amplifier 88, which may correspond to any background information which it is desired to transmit simultaneously with the horizontal line and the azimuth spot. It will be understood now that the voltage pulse from the threshold trigger 78 is the video signal corresponding to the desired single horizontal line. In order to correct or compensate for the delay time $$\frac{V}{2a}$$

which it will be noted is constant, the stored elevation spot 51 may be displaced, say, upwards with respect to the azimuth spot 47. This may be accomplished by simply inserting the proper voltage by way of a D. C. correction voltage in the vertical deflection amplifier 24 of Fig. 1, or for example by suitably adjusting the potentiometer 35a of Fig. 1. That there are other means of displacing one or the other of the stored elevation spot and the stored azimuth spot with respect to each other will be obvious. This constant displacement enables the visual line 130 on the final display as illustrated in Fig. 8 to be placed at the proper position with respect to the visual azimuth spot 132. The signals from the flying spot camera and amplifier 88 may result in the production of such visual information as the runway line 134, the line 136 which crosses the runway line 134 at the desired touchdown point, and any other background information which it may be desired to transmit or reproduce.

If the ground station antennas 5 and 7 are reasonably near the touchdown point, there is no serious error in the indications. However, if greater accuracy is desired, or if the antennas are a considerable distance from this touchdown point, a compensation may be provided to correct for the parallax between the two positions, that near the runway, and that of the antennas. This compensation may be effected by distorting the wave form of the range sweep voltage as applied to the mixer 29. The amount of distortion should vary with the elevation of the beam of antenna 7 and with the range, and is of such form as to make the range sweep voltage curves distorted. Means for providing such distortion are not part of the present invention and accordingly are not claimed herein.

It will be apparent that there has been disclosed a ground approach system in which, by means of a radar system, substantially continuous information with respect to the range azimuth and elevation of an aircraft is supplied, and in which a storage tube is employed, to derive television signals for producing the desired display. An elevation and azimuth channel are provided for deriving signals corresponding to the elevation and azimuth of the aircraft. In the elevation channel a monostable pulse circuit is employed to produce a single pulse signal in proper time relationship with the signals from the elevation channels so that the mixed signals are in the proper time relationship to produce the desired information displayed. Preferably, the duration of the single pulse from the monostable multivibrator is substantially equal to one sweep period of the television sweep circuits so that a single narrow bright line, having a width corresponding substantially to that of a single sweep line is produced, this single line being displaced from the azimuth or aircraft spot by an amount corresponding to the angular deviation of the aircraft from the desired glide path. More exact and informative information may be secured by inspection of the resultant display than has been possible heretofore.

What is claimed is:

1. A ground approach system for tracking an aircraft comprising at a ground station, radar means scanning alternately in azimuth and elevation throughout respective sectors which include the glide path to be followed in landing, said radar means providing substantially continuous information as to the range, azimuth, and elevation of an aircraft within said path, a storage tube having a cathode ray and storage target means for storing said information in an azimuth zone and an elevation zone distinct from each other on said target, means controlling said cathode ray in response to said radar means during scanning in azimuth to produce in said azimuth zone a stored spot whose position with respect to the undeflected position of said ray corresponds to the position of said aircraft in range and azimuth with respect to said ground station, and means controlling said cathode ray during scanning in elevation to produce in said elevation zone a stored spot whose position along a line with respect to said undeflected position corresponds to said range plus a quantity proportional to the elevation angle of said aircraft from the elevation angle of said glide path, means for deriving in separate azimuth and elevation channels signals corresponding respectively to those stored in said zones, said channel signals being correlated with sweep signals for display on a cathode ray tube, means in said elevation channel comprising a monostable pulse circuit for producing a single pulse signal of predetermined time duration substantially equal to that of a single one of said sweep signals and corresponding to said stored elevation spot, and means to mix the said single predetermined time duration pulse and signals from said azimuth channel in time relationship, whereby the said mixed signals correspond to those of a cathode ray tube display in which a visible spot has a position with respect to an undeflected cathode ray tube spot position corresponding to the position of said aircraft in range and azimuth with respect to said ground station, and a visible line in said display resultant from said single predetermined time duration pulse is distant from said undeflected spot position an amount corresponding to said range plus a quantity proportional to deviation of said elevation angle of said aircraft from the elevation angle of said glide path at said range, and said visible line runs through said visible spot only when said aircraft is at the elevation angle of said glide path.

2. A ground approach system for tracking an aircraft comprising at a ground station, radar means scanning alternately in azimuth and elevation throughout respective sectors which include the glide path to be followed in landing, said radar means providing substantially continuous information as to the range, azimuth, and elevation of an aircraft within said sectors, a storage tube having a cathode ray and storage target means for storing said information in an azimuth zone and an elevation zone distinct from each other on said target, means controlling said cathode ray in response to said radar means during scanning in azimuth to produce in said azimuth zone a stored spot whose position with respect to the undeflected position of said ray corresponds to the position of said aircraft in range and azimuth with respect to said ground station, and means controlling said cathode ray during scanning in elevation to produce in said elevation zone a stored spot whose position along a line with respect to said undeflected position corresponds to said range plus a quantity proportional to the elevation angle of said aircraft from the elevation angle of said glide path, means for deriving in separate azimuth and elevation channels signals corresponding to those stored in said zones, said azimuth channel signals being correlated with sweep signals for display on a cathode ray tube, means in said elevation channel comprising a monostable pulse circuit for producing a single pulse of predetermined time duration substantially equal to that of a single one of said sweep signals and corresponding to said stored elevation spot and means to mix the said single predetermined time duration pulse and signals from said azimuth channel in time relationship, and a cathode ray tube including a luminescent screen, means controlling said cathode ray tube in response to said mixed signals, whereby a visible display is produced on said screen in which a visible spot has a position with respect to an undeflected cathode ray tube spot position corresponding to the position of said aircraft in range and azimuth with respect to said ground station, and a visible line resultant from said single predetermined time duration pulse is distant from said undeflected cathode ray tube spot position an amount corresponding to said range pluse a quantity proportional to deviation of said elevation angle of said aircraft from the elevation angle of said glide path at said range and said visible line runs through said visible spot only when said aircraft is at the elevation angle of said glide path.

3. A ground approach system for tracking an aircraft comprising at a ground station, radar means scanning alternately in azimuth and elevation throughout respective sectors which include the glide path to be followed in landing, said radar means providing substantially continuous information as to the range, azimuth, and elevation of an aircraft within said sectors, a storage tube having a cathode ray and storage target means for storing said information in an azimuth zone and an elevation zone distinct from each other on said target, means controlling said cathode ray in response to said radar means during scanning in azimuth to produce in said azimuth zone a stored spot whose position with respect to the undeflected position of said ray corresponds to the position of said aircraft in range and azimuth with respect to said ground station, and means controlling said cathode ray during elevation to produce in said elevation zone a stored spot whose position along a line with respect to said undeflected position corresponds to said range plus a quantity proportional to the elevation angle of said aircraft from the elevation angle of said glide path, means for deriving in separate azimuth and elevation channels signals corresponding to those stored in said zones, said elevation channel signals being a series of pulses and both channel signals being correlated with sweep signals for display on a cathode ray tube, means in said elevation channel comprising a pulse stretching circuit connected to receive said series of pulses to stretch them to form a single pulse, a differentiator connected to receive the stretched single pulse, multivibrator means connected to receive the differentiated stretched pulse, and a monostable pulse circuit connected to said multivibrator means for producing a single pulse of predetermined time duration substantially equal to the time duration of a single one of said sweep signals and corresponding to said stored elevation spot, and means to mix the said last-mentioned single pulse and signals from said elevation channel in time relationship, whereby the said mixed signals correspond to those of a cathode ray tube display in which a visible spot has a position with respect to an undeflected cathode ray tube spot position corresponding to the position of said aircraft in range and azimuth with respect to said ground station, and a visible line in said display resultant from said last-mentioned single pulse is distant from said undeflected spot position an amount corresponding to said range plus a quantity proportional to deviation of said elevation angle of said aircraft from the elevation angle of said glide path at said range and said visible line runs through said display spot only when said aircraft is at the elevation angle of said glide path.

4. A ground approach system for tracking an aircraft comprising at a ground station, radar means scanning alternately in azimuth and elevation throughout respective sectors which include the glide path to be followed in landing, said radar means providing substantially continuous information as to the range, azimuth, and elevation of an aircraft within said sectors, a storage tube having a cathode ray and storage target means for storing said information in an azimuth zone and an elevation zone distinct from each other on said target, means controlling said cathode ray in response to said radar means during scanning in azimuth to produce in said azimuth zone a stored spot whose position with respect to the undeflected position of said ray corresponds to the position of said aircraft in range and azimuth with respect to said ground station, and means controlling said cathode ray during scanning in elevation to produce in said elevation zone a stored spot whose position along a line with respect to said undeflected position corresponds to said range plus a quantity proportional to the elevation angle of said aircraft from the elevation angle of said glide path, means for deriving in separate azimuth and elevation channels signals corresponding to those stored in said zones, said elevation channel signals corresponding to said elevation zone spot being a series of pulses and both channel signals being correlated with sweep signals for display on a cathode ray tube, means in said elevation channel comprising a pulse stretching circuit connected to receive said series of pulses to stretch them to form a single pulse, a differentiator connected to receive the stretched single pulse, multivibrator means connected to receive the differentiated stretched pulse, and a monostable pulse circuit connected to said multivibrator means for producing a single pulse of predetermined time duration substantially equal to the time duration of a single one of said sweep signals and corresponding to said stored elevation spot means to mix the said single predetermined time duration pulse and signals from said azimuth channel in time relationship, and a cathode ray tube including a luminescent screen, means controlling said cathode ray tube in response to said mixed signals, whereby a visible display is produced on said screen, in which a visible spot has a position with respect to an undeflected cathode ray tube spot position corresponding to the position of said aircraft in range and azimuth with respect to said ground station, and a visible line resultant from said predetermined time duration single pulse is distant from said undeflected cathode ray tube spot position an amount corresponding to said range plus a quantity proportional to deviation of said elevation angle of said aircraft from the elevation angle of said glide path at said range and said visible line runs through said visible spot only when said aircraft is at the elevation angle of said glide path.

5. A ground approach system for tracking an aircraft comprising at a ground station, radar means scanning alternately in azimuth and elevation throughout respective sectors which include the glide path to be followed in landing, said radar means providing substantially continuous information as to the range, azimuth, and elevation of an aircraft within said sectors, a storage tube having a cathode ray and storage target means for storing said information in an azimuth zone and an elevation zone distinct from each other on said target, means controlling said cathode ray in response to said radar means during scanning in azimuth to produce in said azimuth zone a stored spot whose position with respect to the undeflected position of said ray corresponds to the position of said aircraft in range and azimuth with respect to said ground station, and means controlling said cathode ray during scanning in elevation to produce in said elevation zone a stored spot whose position along a line with respect to said undeflected position corresponds to said range plus a quantity proportional to the elevation angle of said aircraft from the elevation angle of said glide path, means for deriving in separate azimuth and elevation channels signals corresponding to those stored in said zones, said elevation channel signals corresponding to the elevation zone spot being a series of pulses and both said channel signals being correlated with sweep signals for display on a cathode ray tube, means in said elevation channel comprising a pulse stretching circuit connected to receive said series of pulses to stretch them to form a single pulse, a differentiator connected to receive the stretched single pulse, multivibrator means connected to receive the differentiated stretched pulse including a pair of multivibrator circuits with a common load capacitor, a monostable pulse circuit connected to said load capacitor for producing a pulse of predetermined time duration substantially equal in time duration to a single one of said sweep signals, means to apply a D. C. deflection voltage to said storage tube during one of said azimuth and elevation scans to compensate for the time displacement introduced in said elevation channel including that between said predetermined time duration pulse and an instant of time half-way between the first and last of said elevation channel series of pulses corresponding to the stored elevation spot, and means to mix the said predetermined time duration pulse and signals from said azimuth channel in time relationship, whereby the said mixed signals correspond to those of a cathode ray tube display in which a spot corresponding to said azimuth spot has a position with respect to an undeflected cathode ray tube spot position corresponding to the position of said aircraft in range and azimuth with respect to said ground station, and a visible line resultant from said pulse is distant from said undeflected spot position an amount corresponding to said range plus a quantity proportional to deviation of said elevation angle of said aircraft from the elevation angle of said glide path at said range and said line runs through said display spot only when said aircraft is at the elevation angle of said glide path.

6. The system claimed in claim 2, said means controlling said cathode ray tube including a television transmitter link between said mixer and said cathode ray tube.

7. The system claimed in claim 2, said monostable pulse circuit comprising a monostable multivibrator.

8. In an electrical system having a storage tube, means to store a spot thereon, and means to read the stored spot to derive at each reading a series of impulses representing the stored spot, the combination comprising a pulse stretching circuit connected to said reading means to produce a single pulse having a time duration from the first to the last of said series, a differentiating circuit connected to differentiate the said single pulse, and other means comprising a monostable pulse circuit connected to receive said differentiated single pulse and to produce a derived pulse having its inception a predetermined time interval after the mean time of said differentiated single pulse.

9. The combination claimed in claim 8, said other means comprising a pair of monostable pulse circuits in addition to said first, each one of said pair of monostable pulse circuits having a load circuit including a capacitor common to both said load circuits.

10. The combination claimed in claim 9, said first monostable pulse circuit being connected to said capacitor and responsive to produce a pulse at a predetermined voltage level across said capacitor.

11. In an electrical system, means to derive a single pulse having its inception a predetermined time after the mean time of occurrence of a series of pulses, comprising a pulse stretching circuit to which said pulses are applied to produce a single stretched pulse having its inception and termination respectively substantially coincident with the first and last pulse of said series, a differentiating circuit connected to receive said stretched pulse, a timing circuit connected to receive the differentiating circuit output and having an output reaching a predetermined voltage V a predetermined time after the mean time of inception and termination of said stretched pulse, and means comprising a monostable pulse circuit connected to receive said timing circuit output to produce a pulse when said timing circuit output reaches said voltage value V having its inception a predetermined time after the mean time of occurrence of said stretched pulse.

12. In the electrical system claimed in claim 11, said timing circuit including a storage capacitor the voltage across which is said output voltage.

13. In the electrical system claimed in claim 11, said timing circuit including a storage capacitor, and a charging cut connected to charge said capacitor at a first rate in response to the differentiated pulse portion corresponding to the inception of said stretched pulse and at a second rate in response to the differentiated pulse portion corresponding to the said stretched pulse termination.

14. In the electrical system claimed in claim 13, said charging circuit comprising a pair of monostable multivibrators having as a common load capacitor said storage capacitor.

JOHN N. MARSHALL.

References Cited in the file of this patent

UNITED STATES PATENTS

| Number | Name | Date |
| --- | --- | --- |
| 2,373,145 | Sensiper et al. | Apr. 10, 1945 |
| 2,430,307 | Smith | Nov. 4, 1947 |
| 2,480,068 | Wolff | Aug. 23, 1949 |
| 2,549,072 | Epstein | Apr. 17, 1951 |